No. 647,850. Patented Apr. 17, 1900.
G. S. LEE.
HAND STREET SWEEPING CART.
(Application filed Aug. 29, 1899.)
(No Model.)
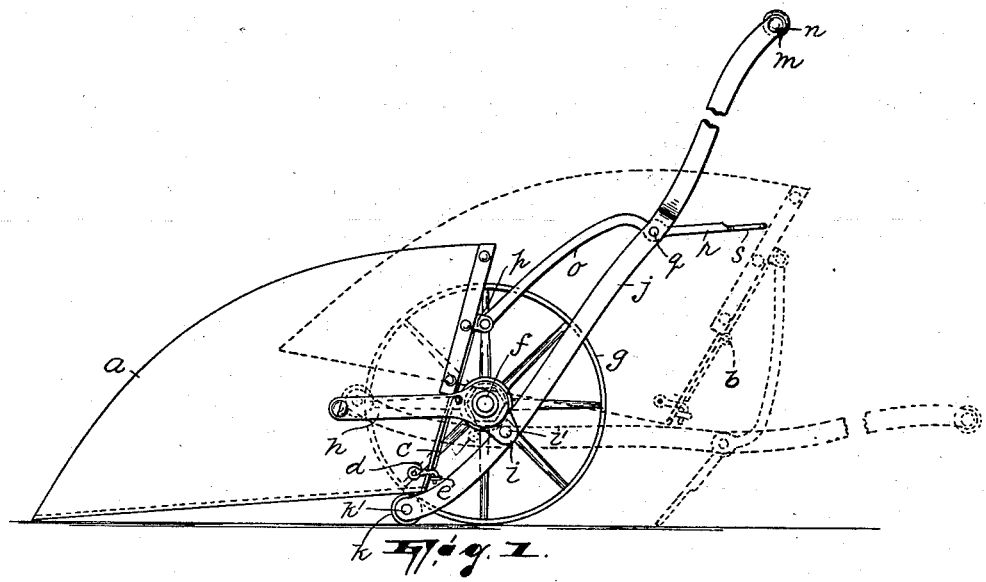
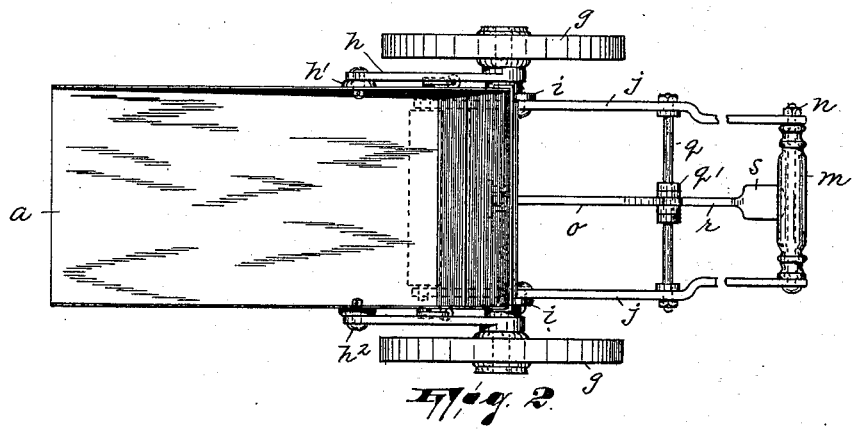
WITNESSES: Wm. S. Bell. Robert J. Pollitt.
INVENTOR, George S. Lee,
BY Gartner & Steward
ATTORNEYS.

UNITED STATES PATENT OFFICE.

GEORGE SANFORD LEE, OF HAWTHORNE, NEW JERSEY, ASSIGNOR TO FRED W. WENTWORTH, OF PATERSON, NEW JERSEY.

HAND STREET-SWEEPING CART.

SPECIFICATION forming part of Letters Patent No. 647,850, dated April 17, 1900.

Application filed August 29, 1899. Serial No. 728,831. (No model.)

*To all whom it may concern:*

Be it known that I, GEORGE SANFORD LEE, a citizen of the United States, residing in Hawthorne, in the county of Passaic and State of New Jersey, have invented certain new and useful Improvements in Hand Street-Sweeping Carts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

One object of my present invention is to provide a scoop mounted on wheels, so as to be easily moved about, which will be adequately adapted for use on roads, streets, or the like for such purposes as removing refuse therefrom, &c.

A further object of my invention is to so construct the mechanism for sustaining the scoop on its wheels that said scoop may with facility be thrown from its active position into a rest position, in which last-named position the implement may be most readily moved from place to place.

The invention consists in the improved scoop and in the combination and arrangement of its various parts, substantially as will be hereinafter pointed out and finally embodied in the clauses of the claim.

The invention is fully illustrated in the accompanying drawings, wherein—

Figure 1 is a side view of my improved scoop, and Fig. 2 is a top plan view of said scoop.

The scoop proper is designated in the drawings by the reference character $a$, and it consists of a box-like structure comprising back, bottom, and two side walls, the back wall having the lower portion thereof hinged to the upper portion, as at $b$, to form a gate $c$, that may be kept shut by means of hooks $d$, pivoted to the side walls of the scoop and engaging eyelets $e$ on the gate.

$f$ is an axle upon which is journaled two wheels $g$. This axle constitutes the fulcrum for a pair of levers $h$, that carry the scoop $a$ and are pivotally secured in the side walls thereof, as by trunnions $h^2$, projecting from said side walls and each surrounded by a boss $h'$, that is adapted to space the end of each lever from the side wall. The axle $f$ also carries rigidly secured thereto a pair of arms $i$, having pins $i'$, that project toward each other. Upon the pins carried by said arms is fulcrumed a pair of levers $j$, which are slightly curved in a forward direction at their lower ends and normally project under the scoop. Said lower ends of the levers are furthermore provided with a roller $k$, that is journaled upon a shaft $k'$, connecting said levers, while their upper ends are connected by a cross-bar $m$, that is secured in place by a bolt $n$, penetrating it and the ends of the levers, said cross-bar serving as a handle.

The levers $j$ are pivotally connected to the rear portion of the scoop $a$ by means of a connecting-rod $o$, which is pivoted in a pair of lugs $p$, that project from the back wall of the scoop above the gate, and on a bar $q$, that connects the levers $j$ and acts as a brace therefor. In order to keep the connecting-rod truly in the middle of the bar $q$, collars $q'$ may be secured on said bar both sides of the connecting-rod. The end of the connecting-rod which is pivoted on the bar $q$ is provided with an extension $r$, which is widened at its extremity, as at $s$, to form a foot-treadle. It should be remarked also that the connecting-rod $o$ is curved outwardly—that is to say, away from the axle—so that when the scoop is disposed upon its sustaining means in the position shown in dotted lines in Fig. 1 the gate may be sufficiently opened without difficulty.

In using this implement when the operator desires to throw the scoop from the position shown in full lines in Fig. 1 to the position shown in dotted lines in said figure—that is to say, in a position where the implement can be readily moved about from place to place—it is only necessary to press downwardly on the handle and at the same time shove the scoop ahead quickly, so that the inertia of the scoop and its contents will act to throw the levers $h$ over in a reverse direction about their fulcrums. It should be remarked that this action is considerably facilitated by virtue of the fact that the roller k bears against the rear under portion of the scoop and so tends to lift said scoop as the handle is lowered.

If desired, the attendant may apply his foot to the treadle on the extension of the connecting-rod o and so throw the scoop back into its rest position. It will be seen that the extension r may also be used as a support or rest for keeping the levers j elevated—that is to say, off the ground—while the implement is not in use and the scoop is in its rest position. It should be remarked, however, that it is not essential that the scoop and the levers j be connected by a rod, such as the connecting-rod o, for the implement is thoroughly operative without it.

Having thus fully described my invention, what I claim as new, and desire to secure by Letters Patent, is—

1. The combination of an axle, wheels journaled on said axle, levers carried by said axle, a receptacle pivotally supported by said levers, and other levers operatively connected to said axle, adapted to engage the receptacle at their lower ends, and having a handle at their upper ends, substantially as described.

2. The combination of an axle, wheels journaled on said axle, levers carried by said axle, a receptacle pivotally supported by said levers, and other levers operatively connected to said axle and projecting beneath and adapted to engage the receptacle at their lower ends, and having a handle at their upper ends, substantially as described.

3. The combination of an axle, wheels journaled on said axle, levers carried by said axle, a scoop pivotally supported on said levers, arms mounted on said axle, other levers pivotally connected to said arms, projecting beneath and adapted to engage the scoop at their lower ends, and having a handle at their upper ends, substantially as described.

4. The combination of an axle, wheels journaled on said axle, levers carried by said axle, a scoop provided with a gate at its rear end and pivotally supported by said levers, arms mounted on said axle, other levers pivotally connected to said arms, projecting beneath and adapted to engage the scoop at their lower ends and having a handle at their upper ends, a roller mounted on the lower ends of said last-named levers, and a connecting-rod pivotally secured to the scoop and said last-named levers and provided with an extension adapted as a foot-treadle, substantially as described.

In testimony that I claim the foregoing I have hereunto set my hand this 15th day of August, 1899.

GEORGE SANFORD LEE.

Witnesses:
ALFRED GARTNER,
LOUISE SNYDER.